March 26, 1963  J. E. WATKINS  3,082,991
DIFFERENTIALLY OPERATED VALVE
Filed Dec. 30, 1959
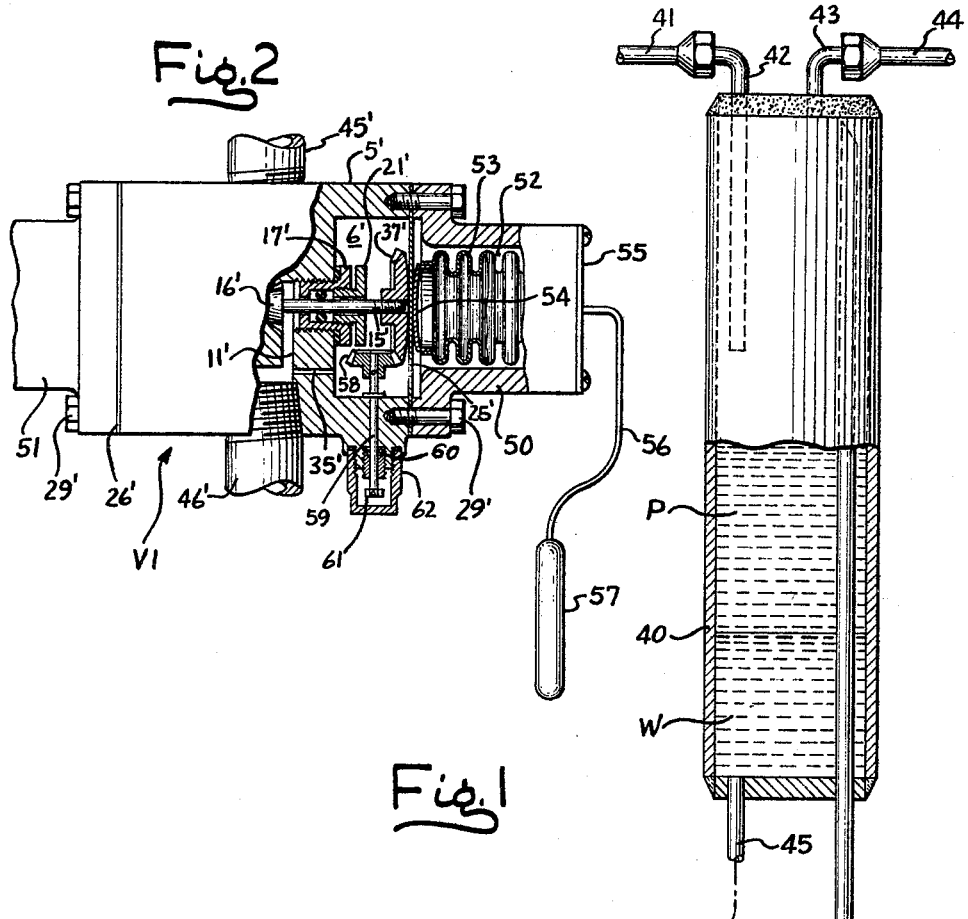
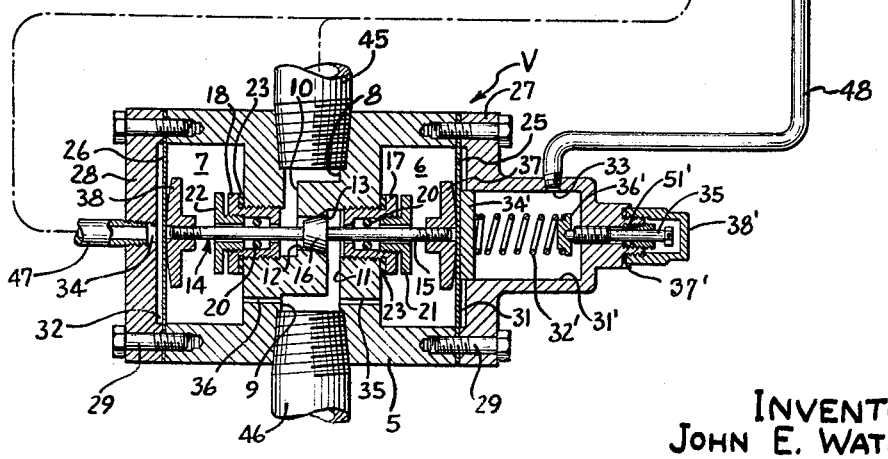
INVENTOR
JOHN E. WATKINS
by: Wolfe, Hubbard, Voit & Osann
ATTYS 3,082,991
DIFFERENTIALLY OPERATED VALVE
John E. Watkins, 307 Lake St., Maywood, Ill.
Filed Dec. 30, 1959, Ser. No. 863,027
3 Claims. (Cl. 251—61)

The invention relates to improvements in flow controlling valves and more particularly to valves operated by pressure differentials.

One object of the invention is to provide a valve of the above general character which is sensitive to extremely small pressure differentials.

A more specific object is to provide a valve of the above type which is simple and inexpensive to manufacture, yet efficient and reliable in operation.

Other objects and advantages of the invention will become apparent from the following detailed description of the preferred embodiments illustrated in the accompanying drawings, in which FIGURE 1 is a longitudinal sectional view through a valve embodying the features of the invention and showing the valve associated with apparatus for separating liquids of different specific gravities.

FIG. 2 is a partially sectioned view of the valve as modified for operation in response to temperature differentials.

While a preferred form and one modification of the improved valve have been shown by way of illustration, it is to be understood that there is no intention to limit the invention to the particular forms illustrated, the intention being to cover all modifications and adaptations falling within the spirit and scope of the invention as more broadly or generally characterized by the appended claims.

Referring to the drawings, the improved valve indicated generally at V has been shown in a form particularly suitable for use with apparatus for separating liquids of different specific gravities. In the form shown in FIG. 1, the valve comprises a body 5 of metal or other suitable material having outwardly opening recesses 6 and 7 at opposite ends. Opening at opposite sides of the body intermediate the recesses are an inlet port 8 and an outlet port 9 connected by a transverse flow passage. The flow passage as shown is formed in two overlapping sections spaced apart axially of the valve body, one section 10 extending inwardly from the port 8 and the other section 11 extending inwardly from the port 9.

An axial passage 12 extends through the valve body between the recesses 6 and 7 and intersects the two sections of the flow passage to make that passage continuous between the inlet and outlet ports. Adjacent one end of the flow passage section, in this instance, the flow passage 11, the axial passage 12 is tapered to define a valve seat 13.

Extending through the axial passage 12 is a movable valve member 14 having an elongated stem 15 projecting into the recesses 6 and 7. The stem 15 is fitted with a tapered head 16 adjacent its midpoint dimensioned to cooperate with the valve seat 13 and close the passage 12 so as to interrupt communication between the two sections of the transverse flow passage. Upon movement of the valve member to the right (as viewed in FIG. 1) the head is withdrawn from seating engagement to open the passage 12 and thus render the transverse passage continuous for the flow of fluid from the inlet to the outlet port.

In the particular valve illustrated the valve member 14 is supported and guided for movement between open and closed positions by guide members 17 and 18 threaded into the ends of the passage 12 which are somewhat enlarged adjacent the recesses 6 and 7. Each guide member has an aperture in its inner end affording clearance for the valve stem 15. A central bore in the outer end of each guide member is dimensioned to accommodate a sealing ring 20. The rings cooperate with the walls of the bores and with the stem to prevent leakage of fluid around the stem into the adjacent recess.

Preferably, the bores in the guide members are closed by threaded plugs 21 and 22 suitably apertured to afford clearance for the valve stem. For convenience of assembly the guide members 17 and 18 and the plugs 21 and 22 are formed with flanges or heads which may be knurled or otherwise shaped to facilitate screwing them into the associated valve part. Gaskets 23 interposed between the flanges of the guide members and the valve body effectively prevent leakage around the members.

The outer ends of the recesses 6 and 7 are closed by resilient flexible diaphragms 25 and 26 rigidly clamped to the valve body by end caps 27 and 28 releasably secured to the body as by screws 29. The inner faces of the end caps are recessed and with the diaphragms define pressure chambers 31 and 32. Ports 33 and 34 in the end caps provide for connecting the chambers 31 and 32 to the pressure sources for controlling the valve. To insure response of the diaphragms to slight changes in pressure in the chambers 31 and 32, the pressure prevailing in the recesses 6 and 7 is equalized either by connecting both to the inlet port 8, or as shown, by venting both to the exhaust port 9 of the valve by way of passages 35 and 36.

The diaphragms 25 and 26 serve to apply force to the valve member 14 for moving it to and retaining it either in an open or a closed position. To this end the valve stem 15 is fitted at opposite ends with shoes 37 and 38 adapted to make direct contact with the respective diaphragms. The shoes may conveniently comprise metal discs with their outer or diaphragm contacting faces convexly formed to eliminate any tendency to stick to the diaphragms. The shoes, as shown, are threaded to the ends of the stems for convenient adjacent.

Additional means is desirably provided for applying force to the valve member to counterbalance the force imposed on the valve member by pressure of the fluid exerted on the head 16. For this purpose, the end cap 27 is formed with a chamber 31' housing a compression spring 32'. At its inner end, the spring is fitted with a thrust member 33' which bears against a pressure plate 34' in contact with the outer face of the diaphragm 25. Adjustment of the load on the spring is effected by an adjusting screw 35' threaded into the end cap and engaging a thrust member 36' bearing against the other end of the spring. The outer end of the adjusting screw is suitably shaped for engagement by a wrench or other tool by which it can be screwed in or out as required. A sealing ring 37' is desirably provided for preventing leakage around the screw. A bonnet 38' threaded on the end cap encloses the projecting end of the screw to prevent inadvertent changes in adjustment.

When the valve is assembled the shoes are adjusted to contact the respective diaphragms with sufficient force to deflect the diaphragms and thus impose a preload on the valve member. The spring 32' is also adjusted so that the valve member is held in the closed position in which it is shown in FIG. 1 as long as the chambers 31 and 32 are subjected to equal pressure. If the pressure balance is disturbed, that is, if the pressure in the chamber 32 exceeds the pressure in the chamber 31 by even a small amount, the valve member is shifted toward the open position, establishing communication between the ports 8 and 9 so that fluid may flow through the valve. Equalization of the pressure in the chambers 31 and 32 permits the diaphragms to return the valve member to closed position and thus interrupt flow through the valve.

By way of illustration, a typical installation of the valve has been shown in FIG. 1. In this case, the valve is connected with a tank 40 of the type commonly interposed in a system for supplying liquid petroleum gas, such as propane, to a burner or other apparatus in which the gas is to be used. Through condensation or other causes, such liquids frequently become contaminated with small amounts of water. If a mixture of propane and water is discharged into the tank, the change in velocity allows the heaver liquid or water to sink to the bottom of the tank while the lighter propane floats on the water. FIG. 1 illustrates a condition in which a substantial amount of water W has accumulated in the tank while the remainder of the tank is filled with propane P. In this environment, the valve V operates to automatically open and drain the water from the tank when a predetermined amount has been accumulated.

In the particular embodiment illustrated, the tank 40, which may be cylindrical in cross section, is relatively long and is supported in an upright position in any suitable manner. Liquid propane with its entrained water is delivered to the tank by way of conduit 41 coupled to an inlet pipe 42 which extends through the top of the tank and preferably projects a substantial distance into the tank. The propane leaves the tank through an outlet 43 opening through the top of the tank and is conveyed by a conduit 44 to the apparatus in which the propane is to be used.

To enable the valve V to control the draining of the tank 40, its inlet port 8 is connected by a conduit 45 with a port opening through the bottom of the tank. A drain conduit 46 extends from the outlet port 9 of the valve to a suitable disposal point. For controlling the valve a branch 47 of the conduit 45 is connected to the port 34 for the pressure chamber 32. The port 33 for the opposed pressure chamber 31 is connected by a conduit 48 with the tank 40, the conduit 48 terminating closely adjacent the top of the tank as shown.

With the valve V positioned at a lower level than the tank P, it will be evident that the diaphragms 25 and 26 will both be subjected to the pressure existing in the tank 40 supplemented by pressure corresponding to the weight of fluid in the conduits and the tank. More particularly, the diaphragm 25 will be subjected to an additional pressure corresponding to the weight of the column of fluid extending from the diaphragm through the conduit 48 to the top of the tank. As the conduit 48 is terminated well above the highest level at which water is allowed to rise in the tank, the conduit will be filled with the lighter fluid or propane and consequently the added pressure on the diaphragm 25 will correspond to the weight of the column of propane.

Conduit 45 opens to the bottom of the tank and consequently is filled with water as the water accumulates in the bottom of the tank. The pressure head in the chamber 32 is therefore determined by the weight of the water column and the overlying lighter propane. Accordingly, the diaphragm 26 will be subjected to a higher pressure than the diaphragm 25 as water accumulates in the tank. The pressure differential corresponds to the difference in weight between the two fluids involved. In the case of propane and water, that differential is approximately 0.217 pound per square inch for a 12″ fluid column.

The valve V, constructed as above, may be adjusted to respond readily to pressure differentials on the above order or even smaller. Such response involves the movement of the valve member 14 to open position. With the valve open the water accumulated in the lower portion of the tank is discharged through the conduit 45 and valve V to the drain conduit 46. As the water level falls the pressure differential in the chambers 31 and 32 correspondingly decreases and when most or all of the water is discharged the force exerted by the diaphragm 25 returns the member to closed position. The apparatus is thus again conditioned for normal operation and the separating process continues in the normal manner until a predetermined amount of water is again accumulated in the tank.

The modified form of the valve shown in FIG. 2 differs from the valve above described only in the means for applying controlling pressure to the movable valve member. Corresponding parts of the valve have therefore been designated by similar prime reference characters.

The modified valve V1 as shown in FIG. 2 has a valve body 5′ with recesses 6′ and 7′ at opposite ends. The recesses are closed by diaphragms 25′ and 26′ of resilient flexible material. End caps 50 and 51 removably secured to the valve body as by screws 29′ clamp the diaphragms over the recesses. The end caps are alike, each having an elongated cup-shaped extension defining a chamber 52 and terminating in a flange dimensioned to fit flush against the valve body.

Each chamber 52 houses a pressure expansible element 53, herein shown as a corrugated bellows of metal or other suitable material. The inner end of the bellows is closed by a convexly shaped end member 54 adapted to bear against the outer face of the adjacent diaphragm 25′ or 26′. The other end of the bellows 53 is suitably anchored to the end cap or to a closure plate 55 removably attached to the outer end of the cap. A capillary tube 56 extending through a hole in the closure plate connects the interior of the bellows with a temperature sensing bulb 57. It will be understood that the bellows, tube and bulb are hermetically sealed and are filled with a gas or liquid which expands or contracts in accordance with temperature sensed by the bulb.

To provide for initial adjustment of the forces acting on the valve member, one of the diaphragm engaging shoes, for example, the shoe 37′, which is threaded on the valve stem 15′, may be constructed so that it can be turned from outside the valve casing. It will be understood, of course, that the stem 15′ will be splined to the valve body or otherwise restrained against rotation.

While the means for turning the shoe 37′ may be of any preferred construction, one construction suitable for that purpose has been shown in FIG. 2 of the drawings. In this case, the shoe is formed with peripheral beveled gear teeth meshing with a pinion 58 carried by a shaft 59 projecting through an opening in one side of the valve body. A gland 60 or other suitable sealing means prevents leakage around the shaft. The outer end 61 of the shaft is formed to receive a wrench or other tool by which the shaft can be turned to effect adjustment of the shoe. A bonnet 62 removably secured to the valve body encloses the projecting end of the shaft to guard against inadvertent interference with the adjustment.

In practice, the valve may be adjusted initially so that the valve member 14′ is held in closed position when the bulbs 57 of both temperature responsive devices sense the same temperatures. If the temperature sensed by the bulb 57 associated with the left end of the valve exceeds the temperature sensed by the other bulb, the pressure in the associated bellows 53 will cause that bellows to expand and displace the diaphragm 26′ inwardly. Such displacement of the diaphragm shifts the valve member 14′ to open position, thus establishing communication between the inlet and outlet conduits 45′ and 46′ as previously described. The valve is held open as long as the temperature differential exists and when the temperatures are again equalized, the pressure element associated with the diaphragm 25′ shifts the valve member back to closed position.

It will be apparent from the foregoing that the invention provides a differentially operated flow control valve of novel and advantageous construction. The valve is simple in construction, yet extremely sensitive to small pressure differences. Operating forces may be applied directly from two pressure sources to the movable member of the valve or indirectly through the medium of temperature sensing means. In general, the improved valve is simple and inexpensive to build and efficient and reliable in operation.

I claim as my invention:

1. A flow control valve comprising, in combination, an elongated valve body having outwardly opening recesses in opposite ends, inlet and outlet ports opening at opposite sides of said valve body intermediate said recesses, said ports opening to laterally extending passages spaced apart axially of the valve body and connected by an axially disposed passage forming a valve seat, said recesses having openings alined with said axial passage communicating with the respective laterally spaced passages, unbalance valve means including a movable valve member having a stem extending through said axial passage and said openings with its ends projecting into said recesses, a valve element carried by said stem and movable relative to said valve seat to open or close said axial passage as said valve member is shifted axially between two positions, said valve element having an effective area, exposed to pressure from said inlet port producing an unbalancing force tending to raise the valve element off said seat opening said axial passage, resilient diaphragms closing the open ends of said recesses, end caps removably secured to opposite ends of the valve body to clamp said diaphragms to the body, each of said heads having a recess in its inner face cooperating with the adjacent diaphragm to define a pressure chamber, said end caps also having ports for admitting pressure fluid to the chambers, shoes mounted on the ends of said valve stem in position to contact the respective diaphragms, spring means acting on one of said diaphragms in a direction opposing said unbalancing force to urge the valve element to closed position, means for adjusting the spring to counterbalance the unbalancing force exerted on the valve element tending to move it to open position whereby the valve element is retained in closed position when said chambers are subjected to a predetermined pressure differential.

2. A flow control valve comprising, in combination, an elongated valve body having outwardly opening recesses in opposite ends, inlet and outlet ports opening at opposite sides of said valve body intermediate said recesses, said ports opening to laterally extending passages spaced apart axially of the valve body and connected by an axially disposed passage forming a valve seat, said recesses having openings aligned with said axial passage communicating with the respective laterally spaced passages, unbalanced valve means including a movable valve member having a stem extending through said axial passage and said openings with its ends projecting into said recess, a valve element carried by said stem and movable relative to said seat to open or close said axial passage as said valve member is shifted axially between two positions, said valve element having an effective area exposed to pressure from said inlet port producing an unbalancing force tending to raise the valve element off said seat opening said axial passage, resilient diaphragms closing the open ends of said recesses, end caps removably secured to opposite ends of the valve body to clamp said diaphragms to the body, each of said caps having a recess in its inner face cooperating with the adjacent diaphragm to define a pressure chamber, vent passages connecting the inner ends of both of said recesses to said outlet port operative to equalize the pressures behind said diaphragms and condition them to respond to very small pressure differentials, said end caps also having ports for admitting pressure fluid to the chambers, and shoes mounted on the ends of said valve stem in position to contact the respective diaphragms, said shoes being adjustable relative to the stem to change the effective lengths of the valve member between the valve element and the diaphragm associated with one shoe thereby to unbalance the resilient force exerted on the stem by the respective diaphragms in the direction opposing said unbalancing force, spring means acting on one of said diaphragms in a direction opposing said unbalancing force to urge the valve element to closed position, means for adjusting said spring means to vary the counterbalancing force effective on said valve element in conjunction with the force on the stem by the respective diaphragms so as to retain the valve member in closed position when said chambers are subjected to a predetermined differential pressure, one of said diaphragms being operative to shift the valve member to open position when the pressure in the adjacent chamber exceeds the pressure in the other chamber by an amount greater than said differential pressure.

3. A flow control valve compromising, in combination, an elongated valve body having outwardly opening recesses in opposite ends, inlet and outlet ports opening at opposite sides of said valve body intermediate said recesses, said ports opening to laterally extending passages spaced apart axially of the valve body and connected by an axially disposed passage forming a valve seat, said recesses having openings aligned with said axial passage communicating with the respective laterally spaced passages, unbalanced valve means including a movable valve member having a stem extending through said axial passage and said openings with its ends projecting into said recess, a valve element carried by said stem and movable relative to said seat to open or close said axial passage as said valve member is shifted axially between two positions, said valve element having an effective area exposed to pressure from said inlet port producing an unbalancing force tending to raise the valve element off said seat opening said axial passage, resilient diaphragms closing the open ends of said recesses, end caps removably secured to opposite ends of the valve body to clamp said diphragms to the body, each of said caps having a recess in its inner face cooperating with the adjacent diaphragm to define a pressure chamber, vent passages connecting the inner ends of both of said recesses to said outlet port operative to equalize the pressures behind said diaphragms and condition them to respond to very small pressure differentials, said end caps also having ports for admitting pressure fluid to the chambers, shoes mounted on the ends of said valve stem in position to contact the respective diaphragms, said shoes being adjustable relative to the stem to change the effective lengths of the valve member between the valve element and the diaphragm associated with one shoe thereby to unbalance the resilient force exerted on the stem by the respective diaphragms in the direction opposing said unbalancing force, spring means acting on one of said diaphragms in a direction opposing said unbalancing force to urge the valve element to closed position, means for adjusting said spring means to vary the counterbalancing force effective on said valve element in conjunction with the force on the stem by the respective diaphragms so as to retain the valve member in closed position when said chambers are subjected to a predetermined differential pressure, one of said diaphragms being operative to shift the valve member to open position when the pressure in the adjacent chamber exceeds the pressure in the other chamber by an amount greater than said differential pressure, and means accessible externally of said valve for adjusting the position of one of said shoes.

References Cited in the file of this patent

UNITED STATES PATENTS

| | | |
|---|---|---|
| 1,347,689 | Fitts | July 27, 1920 |
| 1,392,617 | Augustin | Oct. 4, 1921 |
| 1,807,200 | Dennison et al. | May 26, 1931 |
| 2,289,772 | Gilman et al. | July 14, 1942 |
| 2,340,489 | Pontius | Feb. 1, 1944 |
| 2,907,340 | Kenney | Oct. 6, 1959 |
| 2,985,181 | Nixon | May 23, 1961 |